(12) United States Patent
Machnicki et al.

(10) Patent No.: US 9,310,783 B2
(45) Date of Patent: Apr. 12, 2016

(54) DYNAMIC CLOCK AND POWER GATING WITH DECENTRALIZED WAKE-UPS

(71) Applicant: Apple Inc., Cupertino, CA (US)

(72) Inventors: Erik P Machnicki, San Jose, CA (US); Gurjeet S Saund, Saratoga, CA (US); Munetoshi Fukami, Newark, CA (US); Shane J Keil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 13/719,517

(22) Filed: Dec. 19, 2012

(65) Prior Publication Data

US 2014/0167840 A1   Jun. 19, 2014

(51) Int. Cl.
*G05B 11/01* (2006.01)
*G06F 1/32* (2006.01)

(52) U.S. Cl.
CPC .............. *G05B 11/01* (2013.01); *G06F 1/3237* (2013.01); *G06F 1/3253* (2013.01); *Y02B 60/1221* (2013.01); *Y02B 60/1235* (2013.01); *Y02B 60/32* (2013.01)

(58) Field of Classification Search
CPC .............................. G06F 1/3253; G06F 1/3237
See application file for complete search history.

(56) References Cited

U.S. PATENT DOCUMENTS

| | | | |
|---|---|---|---|
| 6,131,167 A | 10/2000 | Cruz | |
| 6,915,438 B2 | 7/2005 | Boros | |
| 6,983,389 B1 * | 1/2006 | Filippo | 713/324 |
| 7,424,315 B2 | 9/2008 | Heuts et al. | |
| 7,487,374 B2 | 2/2009 | Liu et al. | |
| 7,500,204 B2 * | 3/2009 | Pineda De Gyvez | G06F 1/3203 713/323 |
| 7,797,561 B1 | 9/2010 | Abdalla et al. | |
| 8,190,931 B2 | 5/2012 | Laurenti et al. | |
| 8,286,014 B2 * | 10/2012 | Han et al. | 713/320 |
| 8,291,244 B2 * | 10/2012 | Tune | 713/320 |

(Continued)

FOREIGN PATENT DOCUMENTS

| | | |
|---|---|---|
| CN | 101365998 | 2/2009 |
| CN | 102213992 | 10/2011 |
| EP | 2360548 | 2/2011 |
| FR | 2941118 | 7/2010 |
| WO | 9946888 | 9/1999 |

OTHER PUBLICATIONS

International Search Report and Written Opinion from PCT/US2013/076075, dated Feb. 28, 2014, Apple Inc., pp. 1-12.

(Continued)

*Primary Examiner* — Zahid Choudhury
*Assistant Examiner* — Siamak S Hefazi
(74) *Attorney, Agent, or Firm* — Meyertons, Hood, Kivlin, Kowert & Goetzel, P.C.; Erik A. Heter (57) ABSTRACT

A method and apparatus for dynamic clock and power gating and decentralized wakeups is disclosed. In one embodiment, an integrated circuit (IC) includes power-manageable functional units and a power management unit. Each of the power manageable functional units is configured to convey a request to enter a low power state to the power management unit. The power management unit may respond by causing a requesting functional unit to enter the low power state. Should another functional unit initiate a request to communicate with a functional unit currently in the low power state, it may send a request to that functional unit. The receiving functional unit may respond to the request by exiting the low power state and resuming operation in the active state.

25 Claims, 9 Drawing Sheets

(56) References Cited

U.S. PATENT DOCUMENTS

| | | |
|---|---|---|
| 8,423,802 B2 | 4/2013 | Lai |
| 8,438,416 B2 * | 5/2013 | Kocev et al. ............... 713/601 |
| 2004/0199796 A1 * | 10/2004 | Boros ....................... 713/300 |
| 2007/0073956 A1 | 3/2007 | Goma |
| 2011/0202788 A1 * | 8/2011 | Hesse et al. ............... 713/600 |
| 2012/0010234 A1 | 1/2012 | McCormack |
| 2012/0102344 A1 | 4/2012 | Kocev et al. |

OTHER PUBLICATIONS

Office Action and Search Report in ROC (Taiwan) Patent Application No. 102147291, dated Apr. 21, 2015.
Written Opinion, International Application No. PCT/US2013/076075, mailed Jul. 2, 2015, 9 pages.
International Preliminary Report on Patentability, Application No. PCT/US2013/076075, mailed Jul. 2, 2015, 9 pages.

* cited by examiner

DYNAMIC CLOCK AND POWER GATING WITH DECENTRALIZED WAKE-UPS

BACKGROUND

1. Technical Field

This disclosure is directed to integrated circuits, and more particularly, to power management in integrated circuits.

2. Description of the Related Art

In recent years, power management has become an increasingly important factor in the design of integrated circuits (ICs), in part due to increasing levels of integration on a single IC die. The advent of the mobile/portable electronic devices (e.g., smart phones, tablets, etc.) has further driven the demand for more power efficient ICs in order to preserve the battery life of such devices.

Responsive to the demand for more efficient power management on ICs, numerous schemes have been developed. In many ICs, various functional units implemented thereon may be clock gated or power gated. Clock gating may be defined as inhibiting a clock signal from being provided to a functional unit when that unit is idle. Similarly, power gating may be defined as inhibiting power from being provided to a functional unit when it is idle.

In some ICs, various types of hardware may be implemented to manage the power of the various functional blocks thereof. Such hardware may determine when a particular functional unit is idle, and may perform clock gating and/or power gating on that unit responsive thereto. Power management hardware may also resume providing power and/or a clock signal to a functional unit (i.e. 'wake up' the functional unit) in order that it may resume operation.

Software power management is another type of power management that may be implemented. Software instructions executing on an IC configured for processing instructions may determine when various functional units are idle. Responsive to determining that a functional unit is idle, instructions may be executed to cause power gating and/or clock gating. Requests for access or service by the functional unit may be detected by the software, and may be used as a queue to wake up an idle functional unit.

SUMMARY

A method and apparatus for dynamic clock and power gating and decentralized wakeups is disclosed. In one embodiment, an integrated circuit (IC) includes power-manageable functional units and a power management unit. Each of the power manageable functional units is configured to convey a request to enter a low power state to the power management unit. The power management unit may respond by causing a requesting functional unit to enter the low power state. Should another functional unit initiate a request to communicate with a functional unit currently in the low power state, it may send a request to that functional unit. The receiving functional unit may respond to the request by exiting the low power state and resuming operation in the active state.

In one embodiment, a power management unit may initially cause a functional unit to enter a low power state via clock gating (i.e. inhibiting a clock signal from being provided to clocked circuitry internal to the functional unit). If the functional unit remains in a clock gated state for a predetermined amount of time, the power management unit may power gate the functional unit (i.e. prevent power from being received by circuitry internal to the functional unit). Each functional unit may include local power management circuitry that may remain active while the remainder of that functional unit is clock gated or power gated.

Each of the functional units may be coupled to one or more logically adjacent functional units through corresponding communications links. Functional units may be defined as being logically adjacent to one another when they can communicate directly with one another via corresponding communications links. Each power manageable functional unit may be awakened (i.e. caused to exit a low power state) responsive to a request by a logically adjacent functional unit. If a functional unit initiates a transaction with another functional unit that is not logically adjacent thereto, the power management unit may awaken any intervening functional units that may be in the low power state and that are not logically adjacent to the initiating functional unit.

The power management unit may also perform block or domain level clock gating. In one embodiment, a number of different functional units may be coupled to receive a common clock signal (i.e. a clock signal originating at a common source). The different functional units may be clock gated independently of one another. If the power management unit determines that all of the functional units are clock gated, or are requesting to be clock gated and have no further transactions pending, the power management unit may perform clock gating at a domain or block level, i.e. a higher level.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
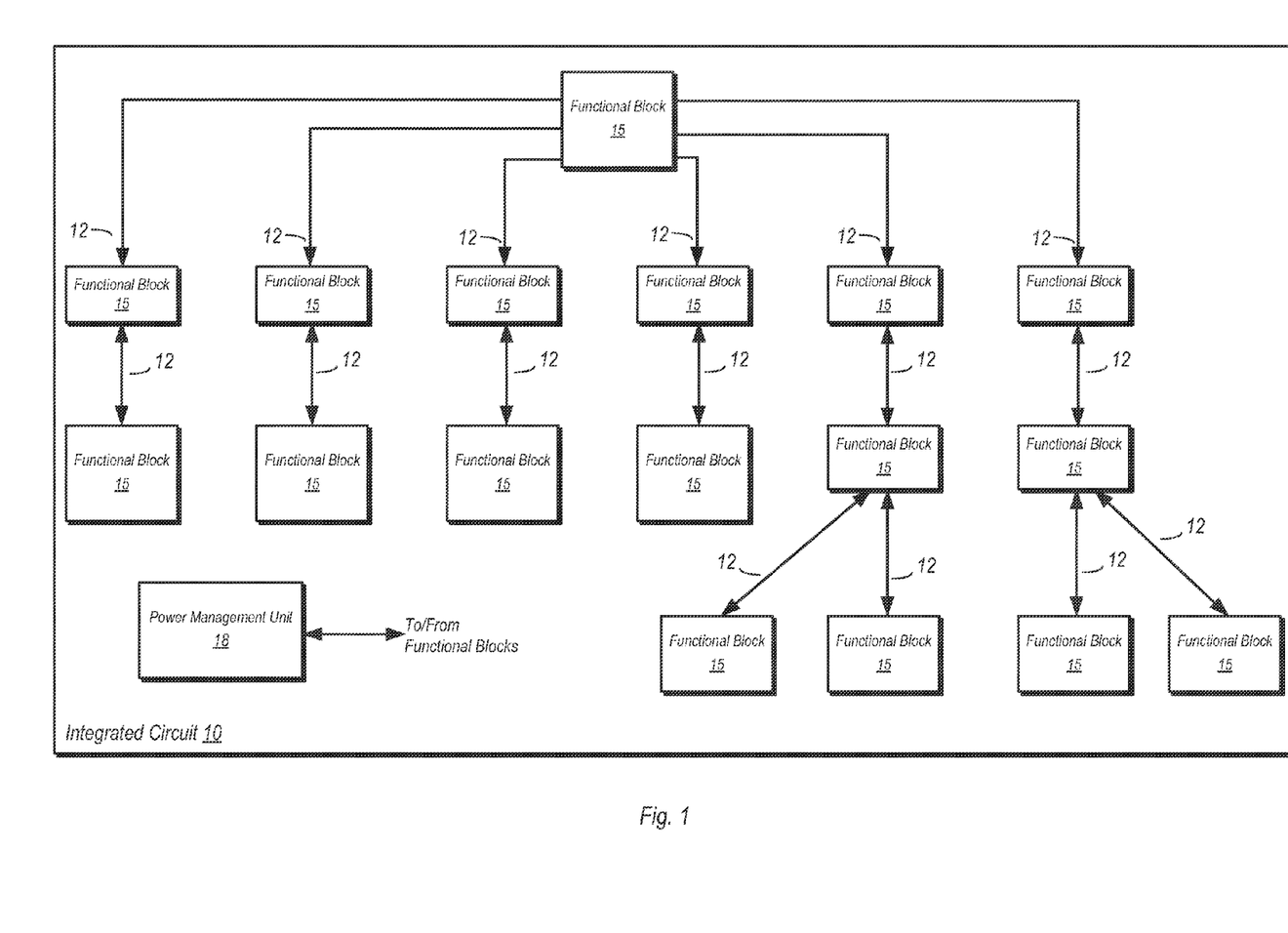
FIG. 1 is a block diagram of one embodiment of an integrated circuit (IC).

Turning now to FIG. 1, a block diagram of one embodiment of an integrated circuit (IC) is shown. In the embodiment shown, IC 10 includes a number of functional blocks 15. Each of the functional blocks 15 may be one of a number of different types of functional units, and may provide different functionality from at least some of the other functional blocks 15. For example, a number of processor cores, one or more graphics processors, one or more input/output (I/O) interfaces, and a memory controller may be included among the various instances of the functional blocks 15 shown in FIG. 1. The arrangement of IC 10 as shown herein is representative of one particular embodiment, although the various method and apparatus embodiments discussed below may be applied to a wide variety of ICs in various configurations and arrangements.

Each of the functional blocks 15 in the embodiment shown is coupled to at least one other functional block 15 by a communications link 12. In the embodiment shown, each communications link 12 is a point-to-point communications link, supporting communications between the pair of functional blocks 15 to which it is coupled. Moreover, each of the communications links 12 may support two-way communications between the two functional blocks 15 to which it is coupled. Functional blocks 15 that are coupled to one another by a given communications link 12 may be said to be logically adjacent to one another for the purposes of this disclosure. Thus, functional blocks 15 as shown in FIG. 1 may communicate directly with other functional blocks 15 that are logically adjacent thereto. For communications between two functional blocks 15 that are not logically adjacent to one another, communications may be routed through one or more intervening functional units.

It is noted that communications links implemented as shared buses are also possible and contemplated, and such buses may support implementation of various features discussed below.

IC 10 in the embodiment shown also includes a power management unit 18, which is coupled to at least some, if not all, of functional blocks 15. Power management unit 18 may perform various actions to control the consumption of power by IC 10. Such functions include clock gating idle functional blocks and power-gating idle functional blocks. Clock gating may be defined herein as inhibiting a clock signal from being provided to circuitry internal to a functional block. Power-gating may be defined herein as inhibiting power from being provided to circuitry internal to a functional block. Power management unit may thus cause a functional block 15 coupled thereto to enter a low power state, wherein a low power state may be defined herein as the functional block being clock gated, power-gated, or both. An active state may be defined herein as a state in which a given functional block 15 is receiving both power and a clock signal, irrespective of whether it is actually performing useful work at that time. A functional block 15 may be defined as being in an idle state when it is not performing useful work and has not for some time, even though it is otherwise receiving both power and a clock signal.

It is noted that (and is discussed in more detail below) that at least some of the power-manageable functional blocks 15 may include some portions of circuitry that may in some cases remain powered on and operational when the functional block 15 is otherwise power-gated and/or clock gated. Such circuitry may locally perform certain power management functions, and some of these functions may be performed under the direction of power management unit 18.

Figure 2:
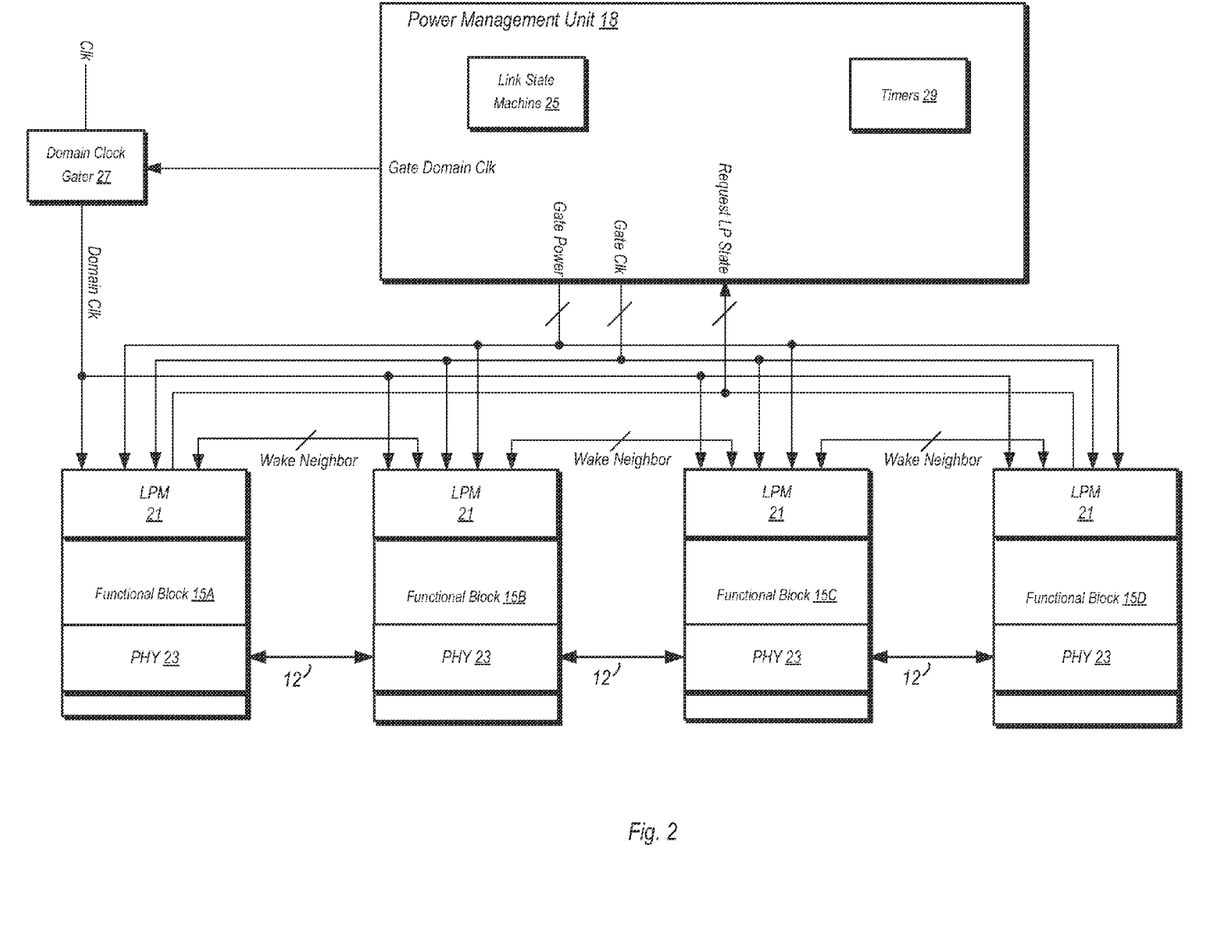
FIG. 2 is a block diagram illustrating a portion of one embodiment of an IC.

FIG. 2 is a block illustrating a portion of one embodiment of an IC. More particularly, FIG. 2 further illustrates the relationship between various functional blocks 15 and the power management unit 18. FIG. 2 also illustrates the relationship between logically adjacent pairs of functional blocks 15 with respect to power management.

In this particular example, four functional blocks, functional blocks 15A-15D are shown as being coupled to power management unit 18. Each of the functional blocks 15A-5D shown in FIG. 2 includes a local power manager 21 and a physical interface 23. Each communications link 12 in the embodiment shown is coupled between the respective physical interfaces 23 of its correspondingly coupled functional blocks.

Each local power manager 21 in the embodiment shown may monitor activity within its respective one of functional blocks 15A-15D. When its respective functional block becomes idle for a predetermined amount of time, the local power manager 21 may assert a signal requesting to be placed in a low power state. The signal may be conveyed to power management unit 18, which may then determine if the corresponding functional block 15 can be clock gated and/or power-gated.

Prior to asserting a request to enter a low power state, a given one of the functional blocks 15 may perform a handshaking routine with its logically adjacent neighbor(s). This may ensure that functional block 15 requesting to be placed in a low power state is not the target of a transaction from a logically adjacent functional block 15. For example, if functional block 15A is idle and intends to initiate a request to be placed in a low power state, it may first perform a handshake routine with functional block 15B to ensure that the latter does not have any pending transactions that would require the former to be available. After receiving acknowledgement from functional block 15B that there are no pending communications therefrom, functional block 15A may assert the request to be placed in a low power state.

In some instances, a functional block 15 may be either a target of a transaction initiated by another functional block that is logically non-adjacent, or may be a conduit through which such a transaction may pass. For example, functional block 15D may initiate a transaction with functional block 15A, with functional blocks 15B and 15C acting as conduits. Since functional blocks 15A and 15D are not logically adjacent to one another, functional block 15A may be unaware of the pending transaction. Accordingly, additional functionality to track pending transactions may be implemented. Although not explicitly shown in FIG. 2, power management 18 may nevertheless implement functionality to track pending transactions between the various functional blocks 15.

Such functionality may be implemented with hardware within power management 18, by software that reports pending transactions thereto, or a combination of these. If a particular functional block 15 requests to be placed in a low power state but otherwise is involved in a pending transaction with another functional block 15 that is logically non-adjacent, power management unit 18 may prevent the requesting functional block from entering the low power state at least until after the pending transaction has completed. In some cases, if follow-up transactions are required, power management unit 18 may continue to prevent the requesting functional block 15 from entering the low power state.

If a functional block 15 has asserted a request to be placed in a low power state and is not involved in any pending transactions, power management unit 18 may thus allow the low power state to be entered. In the embodiment shown, power management unit 18 may respond to a request by a functional block 15 to enter a low power state by asserting a clock gating signal ('Gate Clk'). It is noted that each of the functional blocks 15A-15D may receive a corresponding clock gating signal from power management unit 18 independently of the other functional blocks shown in FIG. 2. Thus, each of the illustrated functional blocks may be clock gated independently of one another.

The local power manager 21 of the requesting functional unit 15 may detect the assertion of the clock gating signal and may respond by gating the domain clock provided thereto via domain clock gater 27. When local power manager 21 locally performs clock gating, circuitry internal to its corresponding functional block 15 is inhibited from receiving the clock signal, and thus dynamic power savings may be achieved.

Power management unit 18 in the embodiment shown includes a number of timers 29 (shown here as a single block, although multiple timers are present). More particularly, power management unit 18 may include at least one time for each of the functional blocks 15A-15D shown in the drawing, and more generally, at least one timer for each power manageable functional block in IC 10. Timers 29 may be used to track the amount of time a given functional block as been in a low power state. If power management unit 18 determines that a given functional block 15 has been clock gated for at least a first time threshold, it may initiate power gating in that functional block to achieve further power savings. To initiate power gating in a given functional block 15, power management unit 18 may assert a corresponding power-gating signal ('Gate Power'). The corresponding power-gating signal may be detected by the local power manager 21 of that functional block. Responsive to detecting the power-gating signal, the local power manager 21 of the affected functional block may initiate power gating. In some cases, the initiating of power gating may include a temporary lifting of clock gating. For example, in some cases, a functional block 15 may be configured to perform a state save prior entering the power-gated state. The clock signal may be provided to the circuitry internal to the functional block 15 during the performance of the state save, which may include writing the internal state of that functional block to a storage medium (e.g., a non-volatile memory) that may be internal or external to the functional block 15. After the state save has been completed, the local power manager 21 may resume clock gating of the functional block 15. The local power manager and may then perform power-gating by inhibiting power from being provided to the circuitry internal to the functional block 15, which may include inhibiting power from being provided to the physical interface 21 thereof.

In the embodiment shown, functional units 15A-15D may be awakened from a low power state either by power management unit 18 or by a logically adjacent functional block 15. If a given functional block 15 is clock gated (but not power gated), power management unit 18 may cause that functional block to re-enter the active state by de-asserting the clock gating signal provided to its corresponding local power manager 21. If a given functional block 15 is power-gated (which typically includes being clock gated), power management unit 18 may cause its re-entry into the active state by de-asserting its respective power-gating signal.

In the embodiment shown, functional blocks 15A-15D are each capable of waking a logically adjacent neighbor by asserting a corresponding wake up signal ('Wake Neighbor'). Consider an example wherein functional block 15A intends to initiate a transaction with functional block 15B and the latter is in a low power state. In such a situation, functional block 15A may assert wake up signal to be received by functional block 15B. Responsive to receiving the wake up signal, functional block 15B may exit the low power state. In general, functional blocks 15 in the embodiments shown in FIGS. 1 and 2 may have the capability of waking up logically adjacent functional blocks independent of power management unit 18 (although power management unit 18 may be informed of the wake up. It is noted however that, subsequent to waking a logically adjacent neighbor by a functional block 15, additional actions may be performed before communications occur across the correspondingly coupled communications link 12. Such actions are discussed below in relation to FIGS. 3 and 4.

As noted above, a functional block 15 in the embodiment shown may initiate a transaction with another functional block 15 that is not logically adjacent thereto. In some instances, multiple functional blocks 15 between the initiating functional block and the target functional block may be in a low power state. Consider an example where functional block 15A is to initiate a transaction with functional block 15D and wherein functional blocks 15B, 15C, and 15D are all in a low power state. Functional block 15A may directly wake up functional block 15B by asserting a corresponding wake up signal. Power management unit 18, using the functionality to track pending transactions discussed above, may detect that functional block 15A intends to initiate a transaction with functional block 15D. Responsive to detecting that functional block 15A is to initiate a transaction with functional block 15D, power management unit 18 may wake up functional blocks 15C and 15D concurrent with functional block 15A waking functional block 15B. The ability to conduct such parallel, concurrent wake ups of multiple functional units 15 by power management unit 18 may reduce the latency to complete a transaction that includes functional blocks that are not logically adjacent to the functional block initiating the transaction.

In the embodiment shown, a domain clock gater 27 is coupled to power management unit 18. Using domain clock gater 27, another level of clock gating may be implemented. Domain clock gater 27 is coupled to receive a clock signal ('Clk') from a clock source (not shown) on IC 10 or external thereto. When domain clock gater 27 is transparent, the clock signal may pass through as the domain clock signal to each of functional blocks 15A-15D. In the event that each of functional blocks 15A-15D are in a low power state, power management unit 18 may assert a gating signal ('Gate Domain Clk') to domain clock gater 27. Responsive to receiving the gating signal from power management unit 18, domain clock gater 27 may inhibit the domain clock signal from being provided to functional units 15A-15D. This may realize additional savings of dynamic power. Generally speaking, at least some functional units within IC 10 may be arranged in domains coupled to receive a common clock signal via a domain clock gater 27 in a manner similar to that shown in FIG. 2. When each of the functional units 15 in a particular clock domain are in a low power state, power management unit 18 may clock gate the entire clock domain, via the corresponding clock gater 27, in order to provide additional power savings.

Power management unit 18 also includes a link state machine 25 in the embodiment shown. Link state machine 25 may be configured to monitor and control the availability of each of the communications links 12. As noted above, while a functional block 15 may wake a logically adjacent functional block 15, this may not be sufficient to initiate communications across a corresponding communications link 12. Accordingly, link state machine 25 may provide additional control over each communications link 12 to ensure that transactions are not initiated with a functional block 15 that is not otherwise prepared to communicate. For the sake of clarity, the relationship between functional blocks 15 and link state machine 25 are shown separately in FIG. 3.

Figure 3:
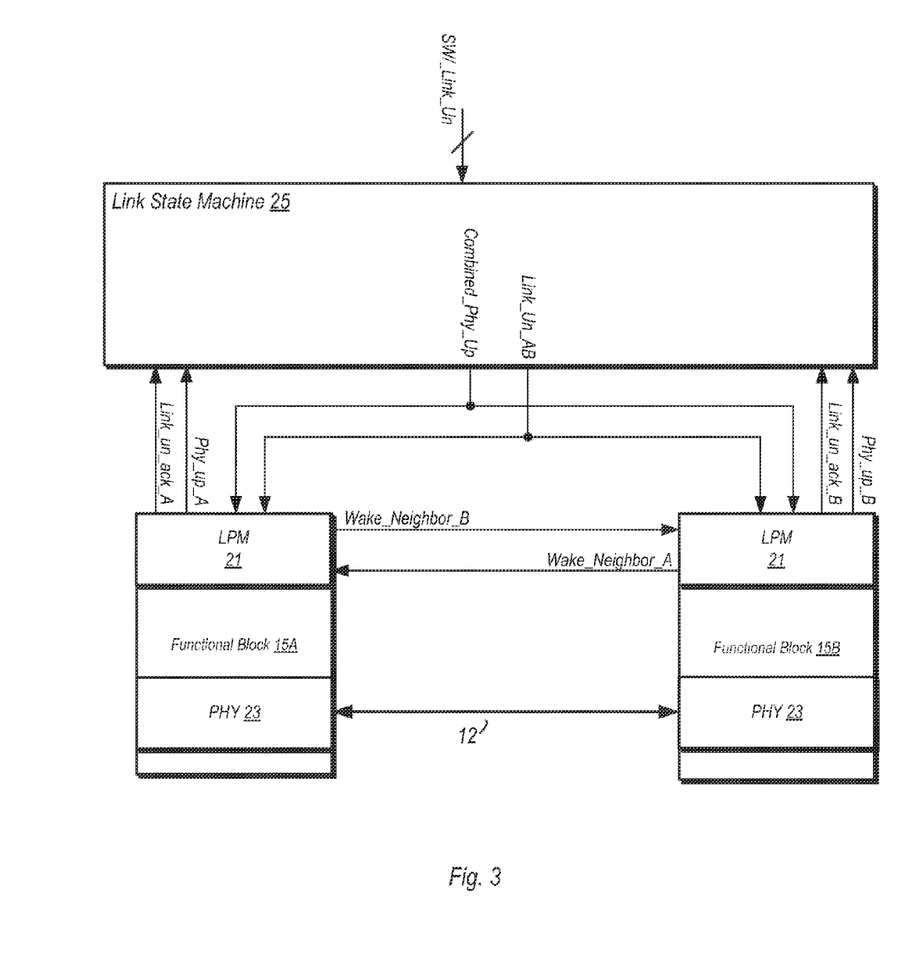
FIG. 3 is a block diagram illustrating one embodiment of a link state machine configured to monitor a communications link between two functional units of an IC.

Turning now to FIG. 3, a block diagram illustrating the relationship between link state machine 25 and two functional blocks 15 coupled by a communications link 12 is shown. It is noted that the relationship between link state machine 25 and functional blocks 15A and 15B shown here may be repeated for other communications links 12 within IC 10 and their corresponding functional blocks 15. It is further noted that in some cases, a link state machine 25 may be associated with a bussed communications link, and may used to indicate and control the availability of communications between pairs of functional blocks coupled to the bus.

In the example shown, link state machine 25 is coupled to functional blocks 15A and 15B, and is configured to enable and disable these functional blocks to control communications over their correspondingly coupled communications link 12.

Communications link 12 in the example shown may be considered active and available for communications between functional blocks 15A and 15B when both are asserting physical interface signals ('Phy_up_A' and 'Phy_up_B') indicating that their respective physical interfaces are asserted, and a link unavailability signal ('Link_Un_AB') is de-asserted. When both physical interface signals are asserted, link state machine may assert a combined indication ('Combined_Phy_Up') that is received by the respective local power managers 21 of functional blocks 15A and 15B. Thus, when functional blocks 15A and 15B are receiving the combined indication and the link unavailability signal is de-asserted, communications link 12 is available.

As noted above, either of functional blocks 15A and 15B may be placed into a low power state by power manager 18. The placing of a given functional block 15 into a low power state may be performed responsive to a request from the given functional block 15, or through a software request. When a software request causes one of functional blocks 15A and 15B to be placed into a low power state, link state machine 25 may receive an indication of the software request ('Sw_Link_Un'). The signal may indicate that the communications link 12 coupled between functional blocks 15A and 15B is no longer available and that at least one of these functional blocks is to be placed in a low power state. Irrespective of whether entry into a low power state is responsive to a software request or a hardware request, the local power manager 21 of a given functional block 15 may, upon entry into the low power state, de-assert its respective physical interface signal. When either of the physical interface signals is de-asserted, or when a corresponding software request is asserted, link state machine 25 may respond by asserting the link unavailability signal, thereby indicating that communications link 12 is currently unavailable. Furthermore, the de-assertion of a physical interface signal by either of the functional blocks 15 associated with a particular communications link 12 may result in link state machine 25 de-asserting the corresponding combined indication.

At some point in time subsequent to the assertion of the link unavailability signal, the local power managers 21 for functional blocks 15A and 15B may each assert respective acknowledgement signals ('Link_un_ack_A' and 'Link_un_ack_B'), indicating acknowledgement of the unavailability of communications link 12. Link state machine 25 in the embodiment shown may utilize these signals in determining when communications link 12 can be made available once again. In particular, link state machine 25 in the embodiment shown is configured to maintain assertion of the link unavailability signal until at least a time when it has received acknowledgement signals from the local power managers 21 of both functional blocks 15A and 15B associated with communications link 12. This may in turn prevent one of functional blocks 15A or 15B from attempting to initiate transactions over communications link 12 when it is unavailable and thus prevent entry into an indeterminate state from which recovery may not be possible without a full reset. For example, functional block 15A may wish to initiate a transaction with functional block 15B, and may thus assert a wake up signal ('Wake_Neighbor_B'). Functional block 15B may be awakened responsive to receiving the asserted wake up signal from functional block 15A. However, the transaction to be initiated by functional block 15B may nevertheless be delayed until link state machine has de-asserted the link unavailability signal and has asserted the combined indication.

After receiving acknowledgement signals from the local power managers 21 of functional blocks 15A and 15B, link state machine 25 may enable communications link 12 to become available again if other conditions are also met. These conditions include the de-assertion of any software requests that would otherwise make communications link 12 unavailable, as well as the respective physical interface 23 of each of functional units 15A and 15B being powered on and thus causing assertion of their respective physical interface signals. In some instances, a given functional block may wait until additional tasks are performed (e.g., re-loading a previously saved state) prior to its corresponding local power manager 21 asserting its respective physical interface signal. Once link state machine 25 has received asserted acknowledgement and physical interface signals and is not receiving a software request that would otherwise disable communications link 12, it may de-assert the link unavailability signal and assert the combined indication. De-assertion of the link unavailability signal and assertion of the combined indication may thus signal to both functional blocks 15A and 15B that communications link 12 is available for conducting transactions therebetween.

Figure 4:
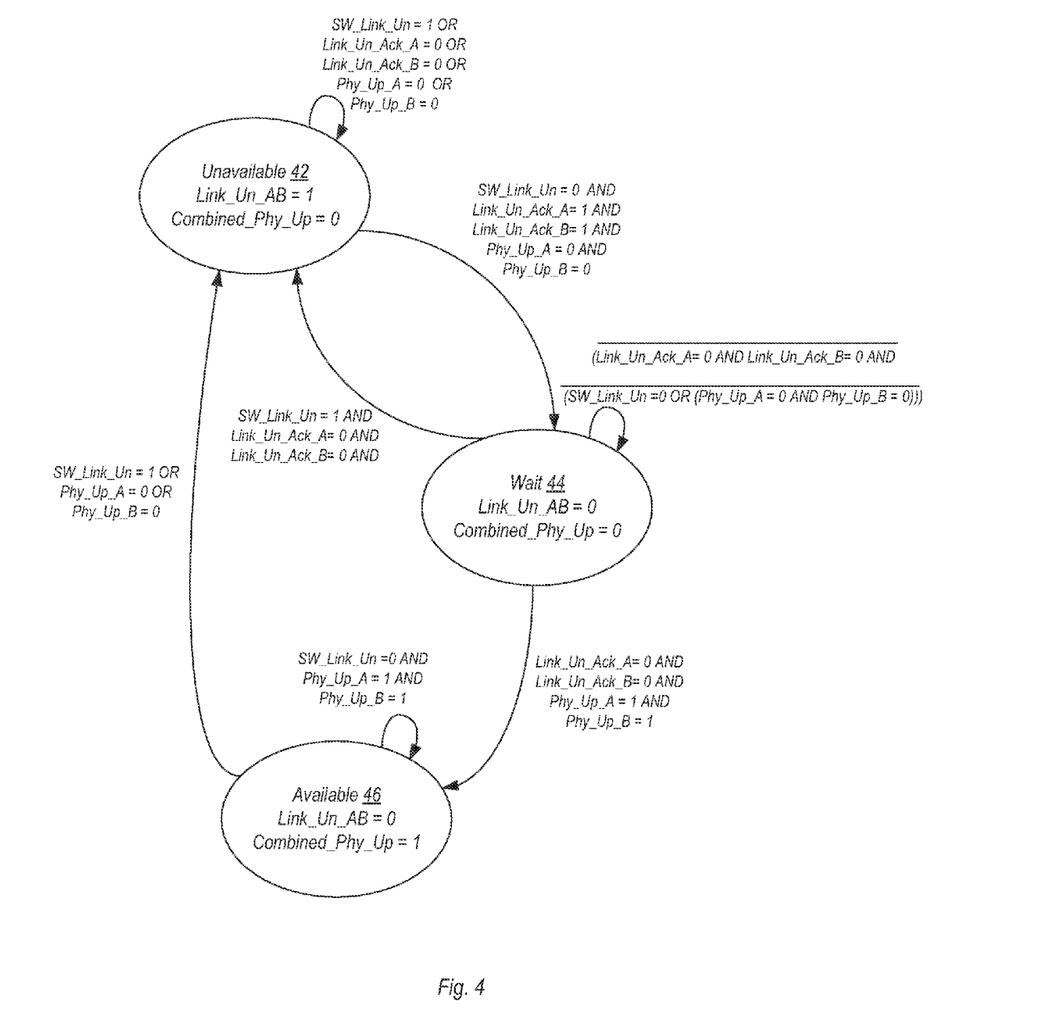
FIG. 4 is a state diagram illustrating operation of one embodiment of a link state machine.

FIG. 4 is a state diagram illustrating operation of one embodiment of a link state machine for one communications link. For the purposes of this discussion, the explanation of the state diagram will begin with link available state and proceed to the link unavailable state and the subsequent return to the available state. It is noted, however, that upon a reset of the link state machine in the embodiment discussed herein, the initial state of operation is in the link unavailable state.

In available state 46, the link unavailability signal is de-asserted (e.g., Link_Un_AB=0) and the combined indication is asserted (e.g., Combined_Phy_Up=1). The link state machine may remain in this state as long as the physical interface signals received from each functional block coupled to the communications link remain asserted (e.g., Phy_up_A=1 and Phy_up_B=1) and no software request to place one or both of the functional units in a low power state or otherwise disable the communications link 12 is received (e.g., SW_Link_Un=0).

The link state machine may transition from available state 46 to unavailable state 42 is any one of three conditions occur. If either physical interface signal is de-asserted (e.g., Phy_up_A=0 or Phy_up_B=0) or a software request that would disable the communications link is received (e.g., SW_Lin_Un=1), then the link state machine transitions from available state 46 to unavailable state 42. In unavailable state 42, the link unavailability signal is asserted (e.g., Link_Un_AB=1) and the combined indication is de-asserted (e.g., Combined_Phy_Up=0). The link state machine may remain in the unavailable state as long as either one of the physical interface signals remains de-asserted, the software request remains asserted, or either of the acknowledgement signals remains de-asserted (e.g., Link_Un_Ack_A=0 or Link_Un_Ack_B=0).

The link state machine for which operation is illustrated by the state diagram of FIG. 4 may implement a wait state 44 between unavailable state 42 and available state 46. In wait state 44, the link unavailability signal may be de-asserted, but the combined indication may remain de-asserted. Communications over the link may be inhibited by as long as the combined indication is de-asserted, even when the link unavailability signal is also de-asserted.

The wait state 44 may be entered when at least some conditions that caused the unavailability of the communications link have been lifted, but the corresponding functional blocks are not fully ready to resume communications. Transition to the wait state may occur after both of the functional units coupled to the communications link have acknowledged the unavailability of the link by asserting respective acknowledgement signals (e.g., Link_Un_Ack_A=1 and Link_Un_Ack_B=1) and the de-assertion of any previously asserted software request (e.g., SW_Link_Un=0). The link state machine may remain in wait state 44 until conditions either cause it to return to one of unavailable state 42 or available state 46.

The link state machine may return from wait state 44 to the unavailable state 42 if another software request is asserted (e.g., SW_Link_Un=1). The link state machine may also return from wait state 44 to the unavailable state 42 if either acknowledgement signal is de-asserted (e.g., Link_Un_Ack_A=1 or Link_Un_Ack_B=1). If the software request remains de-asserted, and both acknowledgement signals remain asserted, the link state machine may transition from wait state 44 to available state 46 once both physical interface signals have been asserted (e.g., Phy_up_A=1 and Phy_up_B=1). The combined indication may be asserted responsive to assertion of both of the link interface signals. Since the link unavailability indication is already in the de-asserted state, the link state machine thus indicates that the link is active and communications between the functional blocks may resume.

Figure 5:
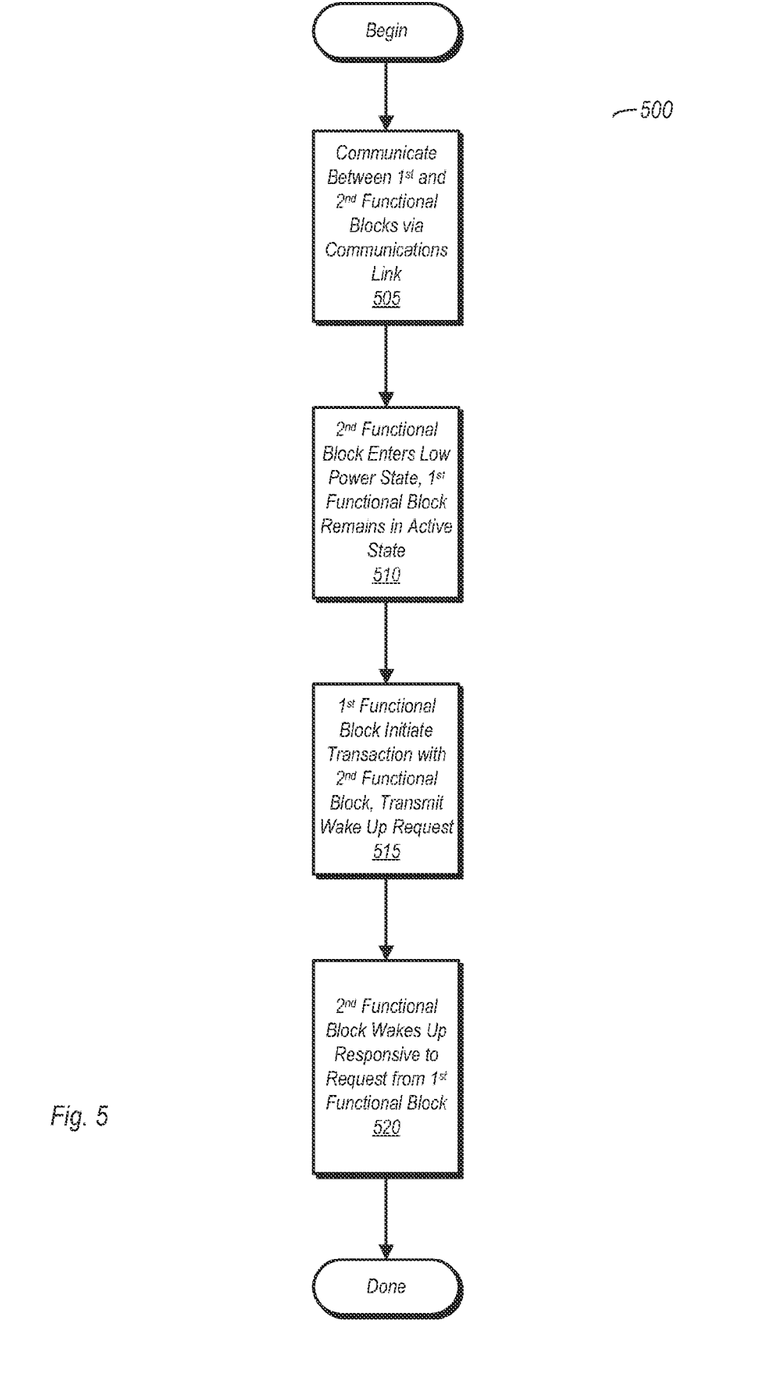
FIG. 5 is a flow diagram illustrating operation of one embodiment of an IC configured to enable decentralized wakeups from a low power state.

Turning now to FIG. 5, a flow diagram illustrating a method of operation for one embodiment of an IC configured to enable decentralized wakeups from a low power state. Method 500 may be performed on the various hardware embodiments discussed above, as well as embodiments not explicitly discussed herein.

Method 500 begins with communications being conducted between first and second functional blocks via a communications link (block 505). At some point after completion of the communications, the second functional block becomes idle and enters a low power state responsive to a request conveyed to a power management unit, while the first functional block remains in an active state (block 510). Subsequent thereto, the first functional block may initiate a transaction beginning with the sending of a wakeup signal to the second functional block (block 515). Responsive to receiving the request from the first functional block, the second functional block may re-enter the active state without waiting for any signal from the power management unit (block 520). After re-entering the active state, the communication link between the first and second functional blocks may be made available, and the transaction may be performed.

Figure 6:
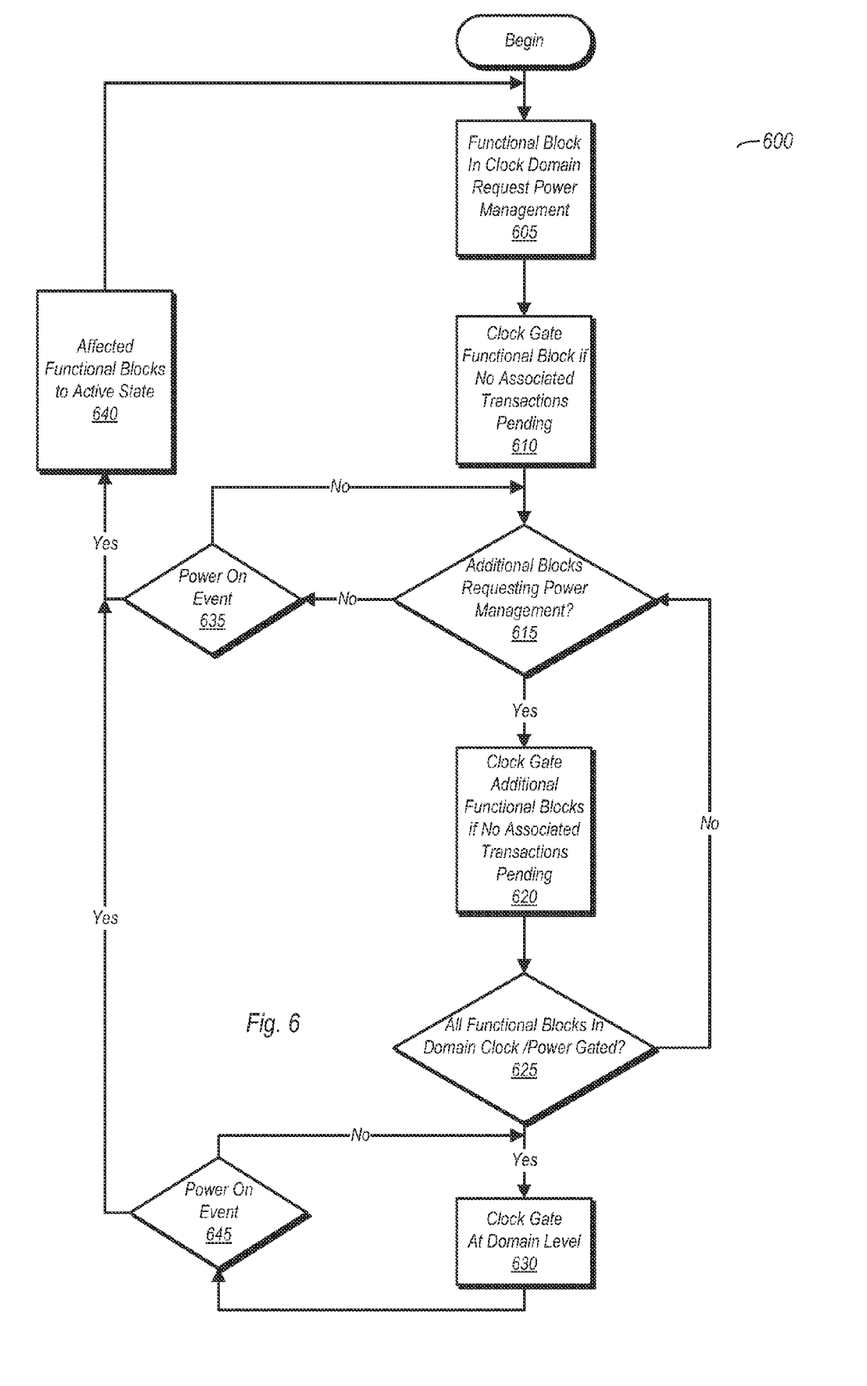
FIG. 6 is a flow diagram illustrating the operation of one embodiment of a power management unit with respect to clock gating functional units sharing a common clock signal.

FIG. 6 is a flow diagram illustrating the operation of one embodiment of a power management unit with respect to clock gating functional units sharing a common clock signal. Method 600 as discussed herein may be performed on hardware embodiments discussed above as well as other hardware embodiments not discussed in this disclosure.

Method 600 in the embodiment shown begins with a functional block in a clock domain requesting power management (block 605), and more particularly, requesting to be placed into a low power state. Upon receiving the request, a power management unit may determine if there are any pending transactions that involve the functional block. If no such transactions are pending, the power management unit may then clock gate the functional block (block 610). If transactions are pending, the power management unit may delay clock gating the functional block until the transactions have completed.

If no additional functional blocks are requesting power management (block 615, no), but a power on event occurs (block 635, yes), the clock gated functional block (and any other clock or power gated functional blocks) may be returned to the active state by the power management unit (block 640). If no other functional blocks are requesting power management (block 615, no) and no power on events have occurred (block 635, no), then the method may remain in a loop between these two blocks. If additional functional blocks are requesting power management (block 615, yes), the power management unit may clock gate these functional blocks if they are not otherwise involved in pending transactions (block 620).

If there are functional blocks within the clock domain that are not presently in a low power state (block 625, no), then method 600 returns to block 615. If all functional blocks within the clock domain are clock gated (if not also power gated; block 625, yes), then clock gating may be performed at a domain level (block 630) using a domain clock gater. Clock gating at the domain level using a domain clock gater (e.g., such as that shown in FIG. 2 and discussed above) may provide additional dynamic power savings.

If no power on event has occurred subsequent to performing the domain-level clock gating (block 645, no), then the method may loop between blocks 630 and 645. If a power on event does occur subsequent to performing domain level clock gating (block 645, yes), then the domain level clock gating may be disabled and the affected functional blocks may be returned to the active state (block 640).

Figure 7:
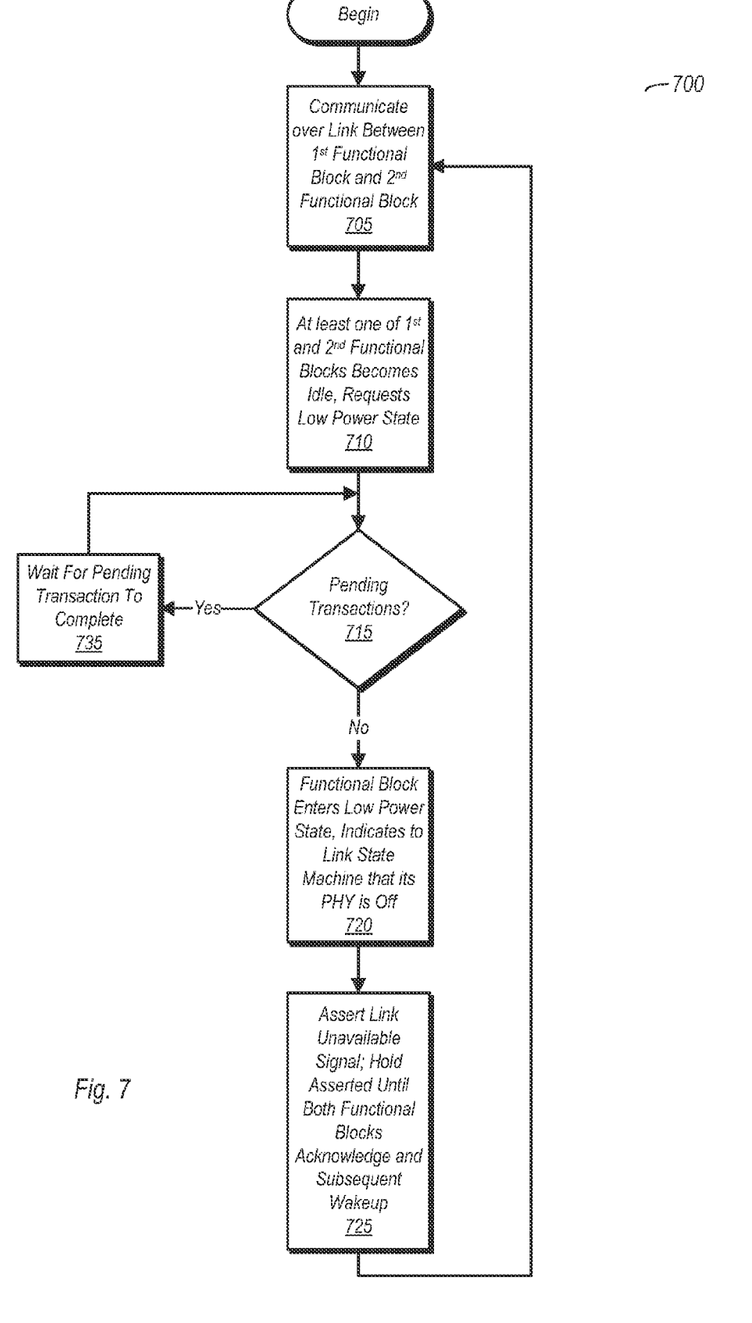
FIG. 7 is a flow diagram illustrating the operation of one embodiment of a link state machine.

FIG. 7 is a flow diagram illustrating the operation of one embodiment of a link state machine. More particularly, FIG. 7 illustrates one method of placing a communications link in an unavailable state responsive to power managing an associated functional block. The operation of the link state machine illustrated in FIG. 7 and described herein may apply to various embodiments of the link state machine discussed above, as well as to embodiments (hardware and/or software) not otherwise discussed herein.

Method 700 begins with communication over a link between a first functional block and a second functional block (block 705). After the present communications have been completed and no further transactions have been initiated, at least one of the first and second functional blocks may become idle, and a request may be asserted to place the idle functional block in a low power state (block 710). The request may be initiated by the idle functional block, or may be initiated by a software request originating externally to the functional block. If transactions involving the requesting functional block are pending (block 715, yes), then the power management unit may wait until such transactions complete (block 735) before placing the functional unit into the low power state. If no additional transactions are pending involving the requesting functional block, the power management unit may place the functional block into a low power state, with the functional block providing an indication to the power management unit that its physical interface is no longer active (block 720). Responsive to receiving the indication that the physical interface of the functional block is no longer active, the link state machine may assert a link unavailable signal, and may hold this signal asserted at least until a time subsequent to receiving an acknowledgement of the unavailability of the link from both functional blocks coupled thereto and a subsequent wake up of one or both functional blocks (block 725). The method may then return to block 705.

Figure 8:
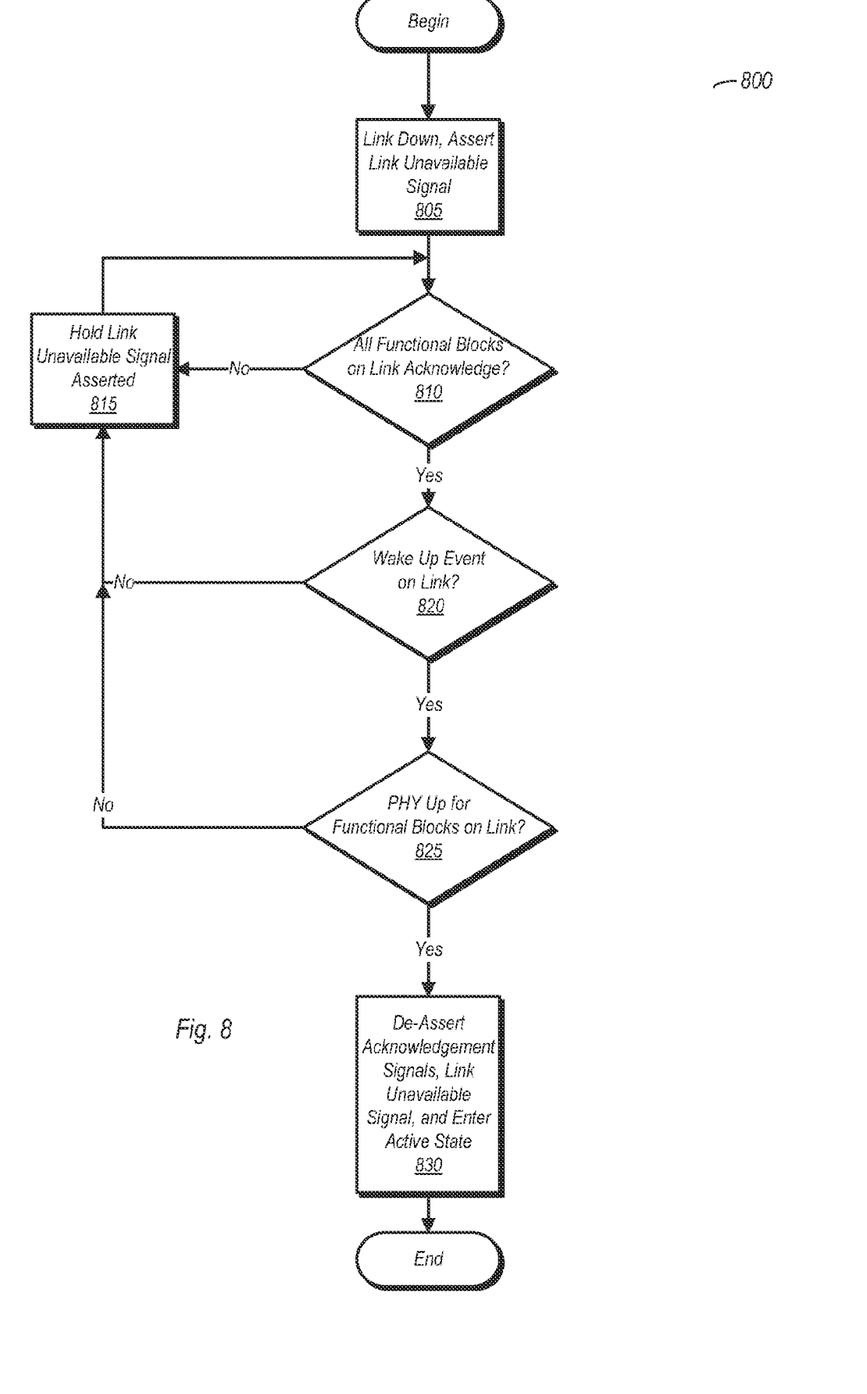
FIG. 8 is a flow diagram illustrating the operation of one embodiment of a link state machine.

FIG. 8 is a flow diagram illustrating the operation of one embodiment of a link state machine. More particularly, FIG. 8 is directed to illustrating operation of one embodiment of a link state machine in returning a link to an available state from an unavailable state. Method 800 may be performed using various embodiments of the link state machine discussed above, and may also be performed using various embodiments (hardware and/or software) not discussed herein.

Method 800 begins with a communications link being in an unavailable state and a link state machine asserting a signal indicating that the link is not available (block 805). If the functional blocks coupled to the link have not each acknowledged the unavailability of the link (block 810, no), then the link unavailable signal is held asserted (block 815) irrespective of other conditions. If the each of the functional blocks coupled to the link have acknowledged the unavailability of the link (block 810, yes), but no wake up event has occurred (block 820, no), then the link unavailability signal remains asserted (block 815). If, subsequent to acknowledgement of link unavailability by all functional blocks coupled to the link and a wake up event has occurred (block 820, yes), the link state machine may determine if the physical interface for each functional block coupled to the link is active. Occurrence of a wake up event may include de-assertion of any software requested power management and any transaction request that would utilize the communication link.

If the link state machine determines that one or more physical interfaces are not yet active (block 825, no), then the link unavailability signal remains asserted (block 815). If all physical interfaces coupled to the link are active (block 825, yes) subsequent to a acknowledgement of link unavailability and a wake up event, then the functional blocks may then assert the acknowledgement signals and enter the active state, with the link state machine de-asserting the link unavailability signal (block 830).

Figure 9:
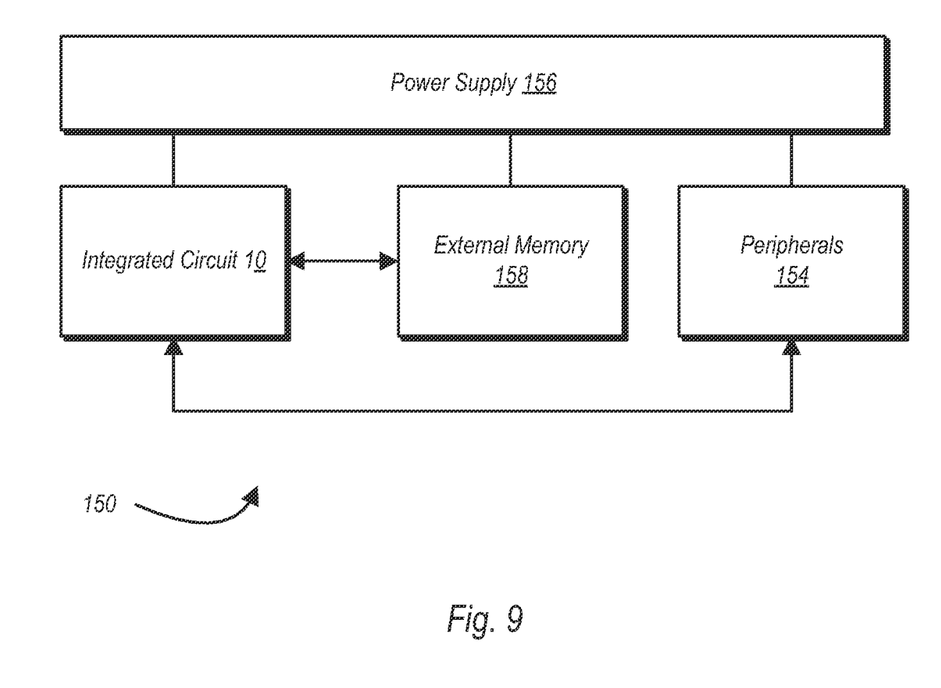
FIG. 9 is a block diagram of one embodiment of an exemplary system.

Turning next to FIG. 9, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
a first functional unit of an integrated circuit (IC), the first functional unit being coupled to a first communications link, the first communications link being one of a plurality of communications links; and
a second functional unit of the IC, wherein the second functional unit is configured to communicate with the first functional unit via the first communication link, wherein the first and second functional units are part of a plurality of functional units, wherein each of the plurality of functional units is coupled to at least one other one of the plurality of functional units by a unique one of the plurality of communications links;
wherein the second functional unit is configured to enter a low power state, and wherein the first functional unit is configured to transmit a request to communicate with the second functional unit when the second functional unit is in the low power state, and wherein the second functional unit is configured to exit the low power state responsive to receiving the request from the first functional unit; and
wherein the apparatus further comprises a power management unit implemented on the IC and configured to power manage each of the plurality of functional units, wherein the power management unit includes a link state machine configured to monitor availability of each of the plurality of communications links; and
wherein each of the plurality of functional units includes a local power management circuit configured to cause internal circuitry of its respective functional unit to enter a low power state based on communications with the power management unit; and
wherein the local power management circuit of each of the plurality of functional circuit blocks is configured to send and receive wake-up requests directly from respective local power management circuits of each logically adjacent one of the plurality of functional circuit blocks, and further configured to wake internal circuitry of its respective one of the plurality of functional circuit blocks from the low power state, independent of the power management unit, responsive to receiving a wake-up request directly from local power management circuit of a logically adjacent one of the plurality of functional units.

2. The apparatus as recited in claim 1, wherein the power management unit is configured to cause internal circuitry of the first and second functional units to be placed into a low power state by corresponding local power management circuits, and wherein the local power management circuit of the second functional unit is configured to, responsive to the request from the first functional unit, cause the internal circuitry of the second functional unit to exit the low power state independently of the power management unit.

3. The apparatus as recited in claim 2, wherein the power management unit is configured to cause the local power management circuit of the second functional unit to place its corresponding internal circuitry into a clock gated state responsive to a request for clock gating from the second functional unit, and further configured to place the second functional unit into a power gated state after a predetermined time in the clock gated state has elapsed.

4. The apparatus as recited in claim 2, wherein the plurality of functional units is coupled to receive a common clock signal via a domain clock gating circuit, and wherein the power management unit is configured to cause the domain clock gating circuit to gate the common clock signal responsive to determining that each of the plurality of functional units is requesting to be clock gated.

5. The apparatus as recited in claim 2, wherein the power management unit is configured to cause at least a subset of the plurality of functional units to exit a low power state responsive to a given one of the plurality of functional units requesting communication with another one of the plurality of functional units that is logically non-adjacent to the given one of the plurality of functional units.

6. A method comprising:
communicating over a first communications link of a plurality of communications links, said communicating being performed by a first functional unit of an integrated circuit (IC) and a second functional unit of the IC, the IC having a plurality of functional units including the first and second functional units, wherein each of the plurality of functional units is coupled to at least one other one of the plurality of functional units by a unique one of the plurality of communications links;
entering, at internal circuitry of the second functional unit, a low power state, wherein entering the low power state is caused by a local power management circuit of the second functional unit based on communications with a power management unit coupled to each of the plurality of functional units;
transmitting, from the first functional unit to the second functional unit, a request for communications over the first communication link;
exiting the low power state at the second functional unit responsive to receiving the request from the first functional unit, wherein the request is conveyed directly from a local power management circuit of the first functional unit to the local power management circuit of the second functional unit and without receiving a signal from the power management unit;
monitoring, by a link state machine in the power management unit, an availability of each of the plurality of communications links.

7. The method as recited in claim 6, wherein said exiting the low power state is performed by the local power management circuit of the second functional unit independently of the power management unit.

8. The method as recited in claim 7, further comprising the second functional unit transmitting a request to enter a low power state to the power management unit, and further comprising the power management unit causing the local power management circuit of the second functional unit to place its internal circuitry into the low power state responsive to receiving the request.

9. The method as recited in claim 7, further comprising:
the first functional unit requesting communications with a third functional unit concurrent with the third functional unit being in the low power state, wherein the third functional unit is coupled to the second functional unit by a second communications link, wherein requesting communications with the third functional unit includes the first functional unit transmitting the request for communications with the third functional unit, via the first communications link, to the second functional unit;
detecting, at the power management unit, the request for communications with the third functional unit;
the second functional unit exiting the low power state responsive to receiving the request for communications with the third functional unit; and
the power management unit causing the third functional unit to exit the low power state responsive to detecting the request for communications with the third functional unit.

10. The method as recited in claim 6, wherein the low power state is one of the following:
a clock gated state; and
a power-gated state.

11. An integrated circuit comprising:
a plurality of functional blocks, wherein at least a first subset of the plurality of functional blocks are each power manageable functional blocks configured to enter a low power state when idle, wherein each of the plurality of functional blocks includes a corresponding local power management circuit configured to perform power management functions on corresponding internal circuitry;
a plurality of communications links, wherein each of the plurality of communications links is a two-way communications link uniquely coupled between corresponding logically adjacent pairs of the plurality of functional blocks; and
a power management circuit coupled to each of the plurality of functional blocks, wherein the power management circuit includes a state machine configured to monitor availability of each of the plurality of communications links;
wherein a first one of the plurality of functional blocks is configured to cause a second one of the plurality of functional blocks to exit the low power state responsive to a request conveyed from the first one of the functional blocks, wherein the request is conveyed directly to a local power management circuit of the second one of the plurality of functional blocks from a local power management circuit of the first one of the plurality of functional blocks.

12. The integrated circuit as recited in claim 11, wherein the first and second ones of the plurality of functional blocks are logically adjacent to one another.

13. The integrated circuit as recited in claim 11, wherein the power management circuit is configured to cause the local power management circuit to place a corresponding given one of the plurality of functional blocks into the low power state responsive to a request from that one of the plurality of functional blocks, and wherein the a first one of the plurality of functional blocks is configured to cause the second one of the plurality of functional blocks to exit the low power state independent of the power management circuit.

14. The integrated circuit as recited in claim 13, wherein the first and second ones of the plurality of functional blocks are logically adjacent to one another, and wherein responsive to a request by the first functional block to communicate with a third one of the plurality of functional blocks that is not logically adjacent to the first functional block, the power management unit is configured to cause the third one of the plurality of functional blocks one or more intervening ones of the plurality of functional blocks to exit the low power state.

15. The integrated circuit as recited in claim 11, wherein at least a second subset of the plurality of functional blocks is in a common clock domain, and wherein each functional block of the second subset is configured to be clock gated independently of other functional blocks of the second subset, and wherein the integrated circuit further includes a domain clock gating circuit configured to inhibit a clock signal from being provided to the common clock domain when each functional block of the second subset is clock gated.

16. A method comprising:
conveying a first request from a first one of a plurality of functional blocks of an integrated circuit to a power management unit of the integrated circuit, wherein the first request is a request to enter a low power state, each of the plurality of functional blocks including a respective local power management circuit configured to perform power management functions on internal circuitry of its corresponding functional block;
placing the first one of the plurality of functional blocks into the low power state responsive to the request, wherein said placing into the low power state is performed by the power management unit;
conveying a second request from a second one of the plurality of functional blocks to the first one of the plurality of functional blocks over a first one of a plurality of communications links, wherein each of plurality of functional blocks is coupled to at least one other one of the plurality of functional blocks by a unique one of the plurality of communications links, wherein the second request is a request for the first one of the plurality of functional blocks to exit the low power state, wherein the first and seconds ones of the plurality of functional blocks are logically adjacent to one another, wherein the second request is conveyed directly from a local power management circuit of the second one of the plurality of functional circuit blocks to a local power management circuit of the first one of the plurality of functional circuit blocks;
exiting the low power state at the first one of the plurality of functional blocks responsive to the second request; and
monitoring, by a link state machine in the power management unit, an availability of each of the plurality of communications links.

17. The method as recited in claim 16, further comprising the first and second functional blocks performing a handshaking routine prior to the first one of the plurality of functional blocks conveying the first request.

18. The method as recited in claim 16, further comprising the power management unit causing the local power management circuit of the first one of the plurality of functional blocks to perform clock gating on circuitry internal to the first one of the plurality of functional blocks responsive to the first request, and further comprising the power management unit causing the local power management circuit of the first one of the plurality of functional blocks to perform power gating on the circuitry internal to the first one of the plurality of functional blocks after a predetermined amount of time has elapsed since the clock gating of the first one of the plurality of functional blocks.

19. The method as recited in claim 16, further comprising:
the second one of the plurality of functional blocks initiating a transaction with a third one of the plurality of functional blocks, wherein the third one of the plurality of functional blocks is logically non-adjacent to the second one of the plurality of functional blocks, and wherein initiating the transaction with the third one of the plurality of functional blocks includes the second one of the plurality of functional blocks conveying the first request to the first one of the plurality of functional blocks;
the power management unit detecting initiation of the transaction with the third one of the plurality of functional blocks; and
the power management unit causing the third one of the plurality of functional blocks and any intervening functional blocks to exit a low power state responsive to detecting initiation of the transaction.

20. The method as recited in claim 16, further comprising:
the power management unit causing the respective power management circuit of each of a subset of the functional blocks to perform clock gating on internal circuitry of each functional block of the subset independently of one another, wherein each of the subset of the plurality of functional blocks is coupled to receive a common clock signal; and
the power management unit clock gating the common clock signal at a domain clock gating circuit responsive to determining that all of the functional blocks of the subset are clock gated.

21. An integrated circuit comprising:
a plurality of functional units including first and second functional units, wherein the first and second functional units are logically adjacent to one another, and wherein each of the plurality of functional units includes a respective local power management circuit configured to perform power management of internal circuitry of its respective one of the plurality of functional units;
a plurality of communications links including a first communications link coupled between the first and second functional units, wherein each of the plurality of functional units is coupled to at least one other one of the plurality of functional units by a unique one of the plurality of communications links; and
a power management unit coupled to each of the plurality of functional units, wherein the power management unit is configured to cause the first functional unit, via its respective local power management circuit, to enter a low power state responsive to receiving a first request from the first functional unit, wherein the power management unit includes a state machine configured to monitor availability of each of the plurality of communications links;
wherein a local power management circuit of the second functional unit is configured to directly convey a request to a local power management circuit of the first functional unit to cause the first functional unit to resume operation in an active state responsive to a second request conveyed from the second functional unit.

22. The integrated circuit as recited in claim 21, wherein each of the plurality of functional units is coupled to at least one logically adjacent one of the plurality of functional units, and wherein the power management unit is configured to cause each of the functional units to enter a low power state via its respective local power management circuit responsive to receiving a corresponding request therefrom.

23. The integrated circuit as recited in claim 22, wherein the power management circuit is configured to monitor transaction requests initiated by each of the plurality of functional units, and wherein the power management unit is further configured to cause multiple ones of the plurality of functional units to be in the active state responsive to a transaction request initiating communications between two of the plurality of functional units that are logically non-adjacent.

24. The integrated circuit as recited in claim 22, wherein responsive to receiving a third request from a given one of the plurality of functional units, the power management unit is configured to:

determine if any transactions that involve the given one of the plurality of functional units are currently pending;

cause a respective local power management circuit to clock gate internal circuitry of the given one of the plurality of functional units responsive to receiving the third request and determining that no transactions involving the given one of the plurality of functional units are currently pending.

25. The integrated circuit as recited in claim 24, wherein the power management unit is further configured to:

determine if a predetermined amount of time has elapsed subsequent to clock gating internal circuitry of the given one of the plurality of functional units; and     cause the respective local power management circuit to power gate the internal circuitry of the given one of the plurality of functional units responsive to determining that the predetermined amount of time has elapsed.

\* \* \* \* \*